METHOD OF FORMING CIRCUMFERENTIALLY SPACED LOCK THREAD PORTIONS

Original Filed June 18, 1962

7 Sheets-Sheet 1

INVENTORS
José Rosán
Albert Jack LaTorre
BY F. Munro Redman
ATTORNEY

METHOD OF FORMING CIRCUMFERENTIALLY SPACED LOCK THREAD PORTIONS

Original Filed June 18, 1962

INVENTORS
José Rosán
Albert Jack La Torre
BY
F. Munro Redman
ATTORNEY

INVENTORS
José Rosán
BY Albert Jack La Torre
ATTORNEY

METHOD OF FORMING CIRCUMFERENTIALLY SPACED LOCK THREAD PORTIONS

Original Filed June 18, 1962 7 Sheets-Sheet 4

INVENTORS
José Rosán
BY Albert Jack La Torre
F. Munns Redman
ATTORNEY

METHOD OF FORMING CIRCUMFERENTIALLY SPACED LOCK THREAD PORTIONS

Original Filed June 18, 1962 7 Sheets-Sheet 5

INVENTORS
José Rosán
Albert Jack La Torre
BY
[signature]
ATTORNEY

INVENTORS
José Rosán
Albert Jack La Torre
BY
ATTORNEY

INVENTORS
José Rosán
BY Albert Jack La Torre
[signature]
ATTORNEY

United States Patent Office 3,334,365
Patented Aug. 8, 1967

3,334,365
METHOD OF FORMING CIRCUMFERENTIALLY SPACED LOCK THREAD PORTIONS

José Rosan, San Juan Capistrano, and Albert Jack La Torre, Santa Ana, Calif., assignors to Rosán Engineering Corporation, Newport Beach, Calif., a corporation of California Original application June 18, 1962, Ser. No. 203,124. Divided and this application May 26, 1965, Ser. No. 471,784
7 Claims. (Cl. 10—86)

This is a division of application Ser. No. 203,124 filed June 18, 1962, and now abandoned.

This invention relates to a method of fabricating thread locks in threaded parts to prevent rotational displacement thereof.

The invention of this disclosure is applicable to a wide range of fasteners, but is especially adapted to use with thin-wall inserts.

The thread lock for use in thin-walled fasteners is characterized by a continuous deformation withina predetermined area of the internal thread. Since the internal threads of the thin-walled insert are made to class 3 tolerances or better, the continuous deformation of the internal thread to accomplish the thread lock requires the use of male fasteners also having class 3 threads.

That is, the precision with which the internal thread and thread lock are made requires a corresponding degree of precision in the mating male fastener to insure satisfactory operability of the lock.

The teachings of this disclosure enables a very satisfactory and permanent lock to be obtained between the insert and a fastener threaded therein. This type of lock, while permitting ready removal of the associated part, will resist the most severe vibrations tending to loosen it.

However, situations exist in which precision in manufacture or assembly is less important than the cost of the male threaded fasteners utilized therein. In such cases it may be advantageous to use less precisely manufactured male fasteners with inserts of high quality, and yet it is desired to obtain a satisfactory lock despite such economies in the male fasteners used.

The rationale underlying the utilization of a relatively precise insert in conjunction with male fasteners characterized by a lesser degree of precision is that the thread lock of the present invention permits the precisely fabricated insert to accommodate and conform to the different inherent tolerances which result from the imprecisely manufactured male fasteners associated therewith. In other words, the inherent characteristics of the interrupted thread lock of this disclosure permit the insert to expand or contract to accommodate the wide tolerance variations which characterize the imprecisely manufactured male fasteners.

It is with this problem of accommodation that the present invention, relating to the internal thread lock and its method of manufacture, is concerned. Heretofore, the methods of locking high precision parts threadably to the insert function by deforming the insert externally during manufacture. This external deformation produces a corresponding deformation of the inner threads sufficient to provide a resilient lock which will not be so severe in its effect as to prevent the introduction of threaded parts into the insert or to result in undue wear on the male parts. At the same time, the interference fit provided by such deformation is capable of preventing the inserted threaded member from becoming loosened and unscrewing even when subjected to severe vibratory conditions.

It will be appreciated that, if the male threaded fasteners have been produced on a relatively high precision basis, such as that defined in the standard thread class 3A or 3B UNF, the adjacent parts of the male fasteners and inserts will mate with sufficient exactness to permit the internal thread lock of the insert to function. That is, the depth of thread root, the height of the thread apex, the flank dimensions, and the like, will be quite similar on both the male fasteners and the inserts, so that a relatively minor deformation applied to one member or the other will produce a satisfactory interference fit or lock, which will remain unaffected by temperature changes.

If, however, for reasons of economy in manufacturing, a screw product of a lower class is used with an insert made to precise standards, the parts can no longer be depended upon to match properly. In such cases thread locks heretofore developed are less reliable. The present invention affords an improvement which will accommodate satisfactorily parts having a substantial dimensional mismatch.

Accordingly, the objects of the invention thus include, but are not limited to:

Providing means for locking together screw parts produced to different tolerance standards;

Providing means for removably locking together screw parts and inserts of different classes so that they will resist the tendency to become loosened when subjected to severe vibration;

Providing means for locking together screw parts with class 2 threads, and inserts with class 3 threads;

Providing means for locking together inserts and fasteners produced in accordance with different tolerances and different hardnesses by incorporating in the internal thread of the insert a thread lock created by a thread deforming force.

Providing an increased degree of locking resilience in the insert wall to improve the dimensional tolerance of the insert.

Figure 1:
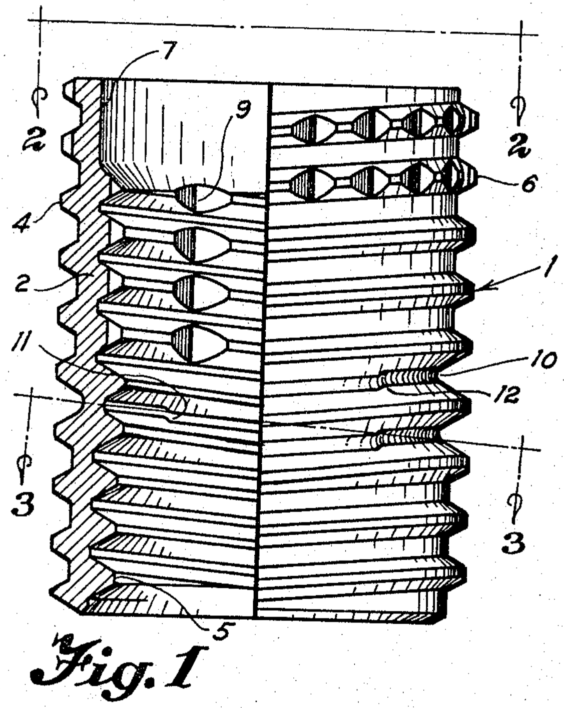
FIG. 1 is a quarter sectional schematic view of a thin-walled insert to which the invention has been applied, showing, solely for the sake of clarity in illustration, the driving groove means extending longitudinally for less than half the length of the insert.

Referring more particularly to FIG. 1 of the drawings, there is illustrated in quarter-sectional view a thin-walled insert to which the improved interrupted peripheral lock of the invention has been applied.

Figures 7, 8:
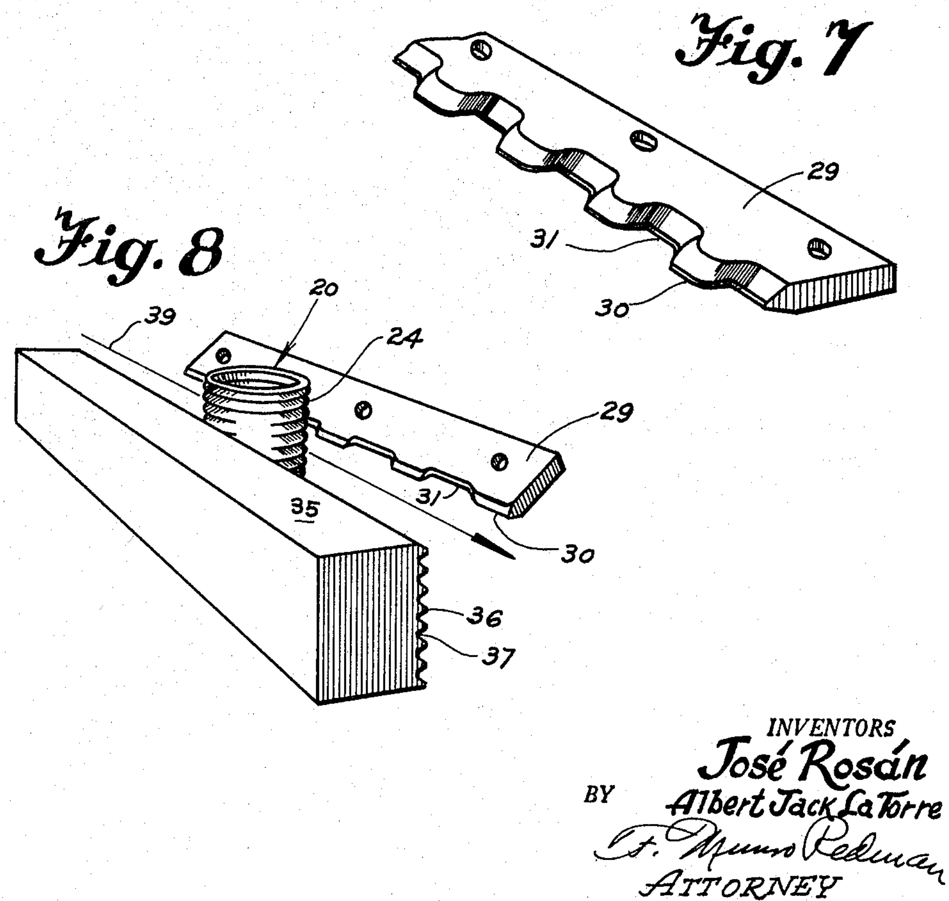
FIG. 7 is a perspective view of a portion of the die blade which forms the indentations, with the indented portion of the blade greatly exaggerated in transverse scale for clarity in illustration.
FIG. 8 is another view of an alternate step in the manufacturing operation in which the insert is being indented by a stationary blade set on the helix angle and is backed up by a thread block instead of the roller shown in FIG. 6; the blade portion which forms the indentations being exaggerated transversely for clarity in illustration.

The interrupted thread lock is produced by using a notched or serrated die blade, having its edge adapted to engage the external periphery of the insert, formed as shown in FIGS. 7 and 8. Each indentation by the blade edge illustrated extends for one-fourth of the distance along the blade required to roll one complete thread convolution of the insert. Thus with the blade surface shown, which has four protruding or indenting portions and four depressed portions, two complete convolutions of the insert thread wall can be intermittently deformed to produce the interrupted lock.

Figure 5:
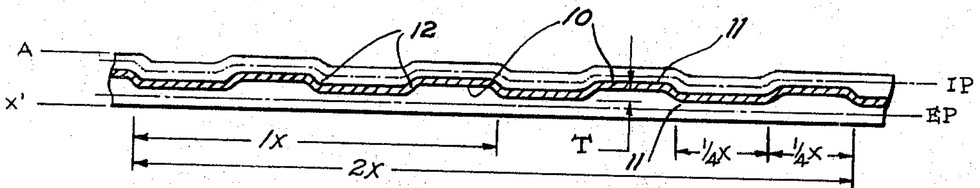
FIG. 5 is a developed view of two thread convolutions, of the type shown in FIG. 3, illustrating the variations in indentation which produces the thread locking feature of the invention, and including the dimensional relations produced by the separate sections of the blade, not shown.

A flat developed sectional view of the insert as deformed by the die blade to produce the interrupted 360° internal peripheral lock is shown in FIG. 5. In production, the die blade is fixed in a machine, in which the insert of FIG. 1 is supported for traversal along the blade and for rotation about its own axis. The blade is pressed against the root of a convolution of the external insert thread at a desired position, and is held against the insert while the latter rotates through a desired number of revolutions with sufficient force to permanently deform the thread root inwardly. This inward deformation causes the internal threads in this area to assume a smaller radius than that which they initially had. The deformed internal radius is, however, normally uniformly intermittent about the rotational axis, and follows the external deformation created by the notched or serrated blade. The combination of the alternating indentations with the interstitial portions retaining their original radii provides an interrupted internal lock on the internal thread of the insert.

The invention thus takes advantage of the resilience of the thin-walled insert material to provide a greater degree of accommodation to varying deviations from the standard in the actual dimensions of the fastener which is being screwed into the insert. Expressed in another way, the resilient material from which the thin-walled insert is formed flexes to a greater degree when the lock is interrupted than when the internal deformation is uniform throughout one or more thread convolutions.

It will be apparent that the interrupted lock of the invention increases the hoop tension in the insert by the displacement inwardly of root portions of the outer periphery of the insert, which is accompanied by corresponding inward displacement of the internal thread of the insert. Thus, in both the external and internal threads of the insert the portions of the threads intermediate the external indentations and internal indentations are stretched during the formation of said indentations. The increased hoop tension of the fastener is directly attributable to this phenomenon. It should be pointed out, however, that while the hoop tension is increased in the portions of the internal and external threads lying between or intermediate the indented portions of said threads, the latter tend to relieve the hoop stress by flexing at the points of transition between the indented and the unindented portions.

Thus there has been disclosed a lock which, because of the superior resilience of the locking threads, is able to accommodate the different spacings presented by screw parts of differing classes, as for example, class 3 and class 2. This permits lower grade machine screws, class 2 for example, to be accommodated by an insert designed primarily to receive screws formed with class 3 threads, yet effectively maintaining the lock therebetween.

For additional details, reference is again made to FIG. 1 of the drawings, in which there is shown a thin-walled insert, indicated generally as 1. This insert has the shape of a generally cylindrical element formed with a very thin wall, and threaded both internally and externally. The thin, strong, resilient wall 2 characteristic of the insert 1 is obtained by modification of the external threads 4. The internal threads 5 are formed upon the internal surface of said wall. The external and internal threads differ in pitch by at least one standard thread size. When so proportioned it is possible to produce an inert having a minimum wall thickness of the order of .010 inch, which will yet have sufficient strength so that an inserted bolt may be completely broken in tension without destroying the threads or disturbing the location of the insert in the parent material. This design effects a relatively high strength attachment to a relatively soft or weak parent material. At the same time the threaded insert affords means for repeated assembly with, or disassembly from, the parent material of other parts by means of attaching bolts without wearing out the threaded bore.

The insert 1, as shown in FIG. 1, is provided with an externally knurled portion 6 at the head end 7 thereof, which will be nearest to the surface of the parent material after installation. The wall section at the head end 7 within the knurled portion 6 is reduced in thickness from that of the main wall 2. It is contemplated that, normally, the parent material, not shown in the figures, will be counterbored in order to provide room for the outward expansion of the wall of the upper knurled head end 7, once the insert has been threaded into place. The knurlings 6 are of hardened material, so that when the head 7 and wall thereof are permanently deformed by being swaged outwardly by an appropriate tool, the knurled teeth will penetrate or bite into the wall of the counterbore. This swaging may best be accomplished by a tool such as that illustrated in the patent application referred to above. Thus the insert will be locked in place, and cannot become unscrewed, even under the most severe conditions of vibration.

In the event that it should at any time become necessary to replace the insert, this may be readily accomplished by drilling out the head 7, so that the locking effect of the teeth is no longer present, and the entire insert may thereafter be unscrewed by the use of an appropriate removal tool, which may be identical with that used in driving the insert into place.

Figure 2:
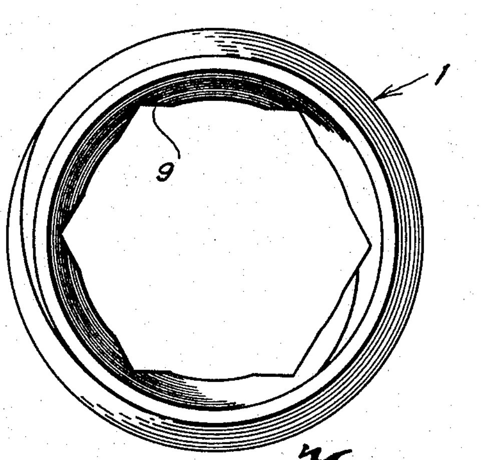
FIG. 2 is a top view of the insert of FIG. 1, taken as shown by the line 2—2 in that figure.

In FIG. 1 there is shown a somewhat schematic quarter sectional view of an insert, illustrating the presence of driving grooves 9, which may also be seen in the end view of FIG. 2. The drive grooves normally extend longitudinally for the full length of the insert except the expanded head portion. The grooves are here illustrated as being 6 in number, although other numbers of grooves are permissible to accomplish the driving effect.

The grooves 9 are shown in FIG. 1 as extending for less than the full length of the insert, solely for clarity in illustration. It will be understood, however, that it is intended that in normal production the driving grooves will extend through the full length of the internally threaded portion of the insert, as is evident from the top plain view of FIG. 2.

Figure 3:
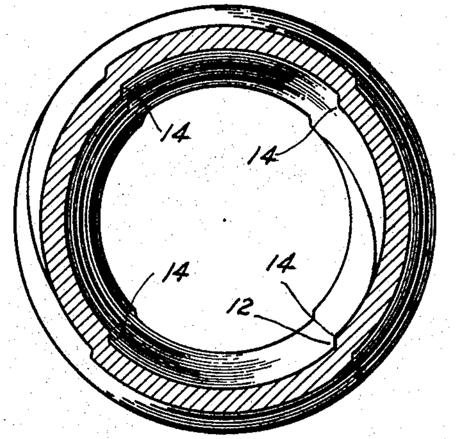
FIG. 3 is a schematic sectional view taken along line 3—3 of FIG. 1 to show the locking formation exaggerated considerably in scale.

The inward deformation of the root 10, which produces in turn the inward deformation of portions of the inner threads, as shown at 11, is effective in producing the internal lock. In FIG. 1 there is shown a plane 3—3, cutting through the thread helix in a direction normal to the helical axis. Thus the view of FIG. 3 illustrates in schematic cross-section the structure of the thread lock portion. In FIG. 5 a depiction of two helix convolutions has been developed unto a flat plane, so that the outer and inner walls are shown in developed section with the outer and inner pitch diameter lines, EP and IP, indicated, as well as the maximum major diameter A and the minimum minor diameter X′ of the internal threads. It will be recognized that this showing is schematic in character in view of the difficulty of developing two turns of a distorted helical structure onto a flat plane.

Note that the interrupted indentations cover alternate quarters of the developed convolutions, with the portions therebetween continuing to be of the normal thread root diameter applicable to the remainder of the internal threads 5 and the insert wall 2.

A lock has been shown at 14 in FIG. 3 having two indentations for each convolution, but it will be apparent that alternative indentation patterns may be adopted. One such is that shown in FIG. 4, in which three indentations 15 are produced for each convolution. Each indented portion then occupies ⅙ of the circumference of each thread helix revolution.

While one of the important aspects of the invention relates to the formation of the locking protrusions of the interrupted thread lock on a helix angle defined by the engagement of the die blade with the helix of the external threads, it should be understood that there is no symmetrical relationship between the roots and crests of the external and internal threads. Therefore, the protrusions of the interrupted thread lock are not necessarily formed in the crests of the internal threads during the deformation of the root of the external threads.

Observing the thread wall section adjacent each change of diameter of the externally indented thread root and the correspondingly internally indented inner thread, it will be seen that at the points of each change of diameter there will be a flexure section 12. Each such section will permit the wall to adjust itself to dimensional irregularities. Hence the conjunction of the locking portion of the insert with dimensionally irregular portions of the part inserted therein will not destroy the locking effect.

Figures 14, 15, 16:
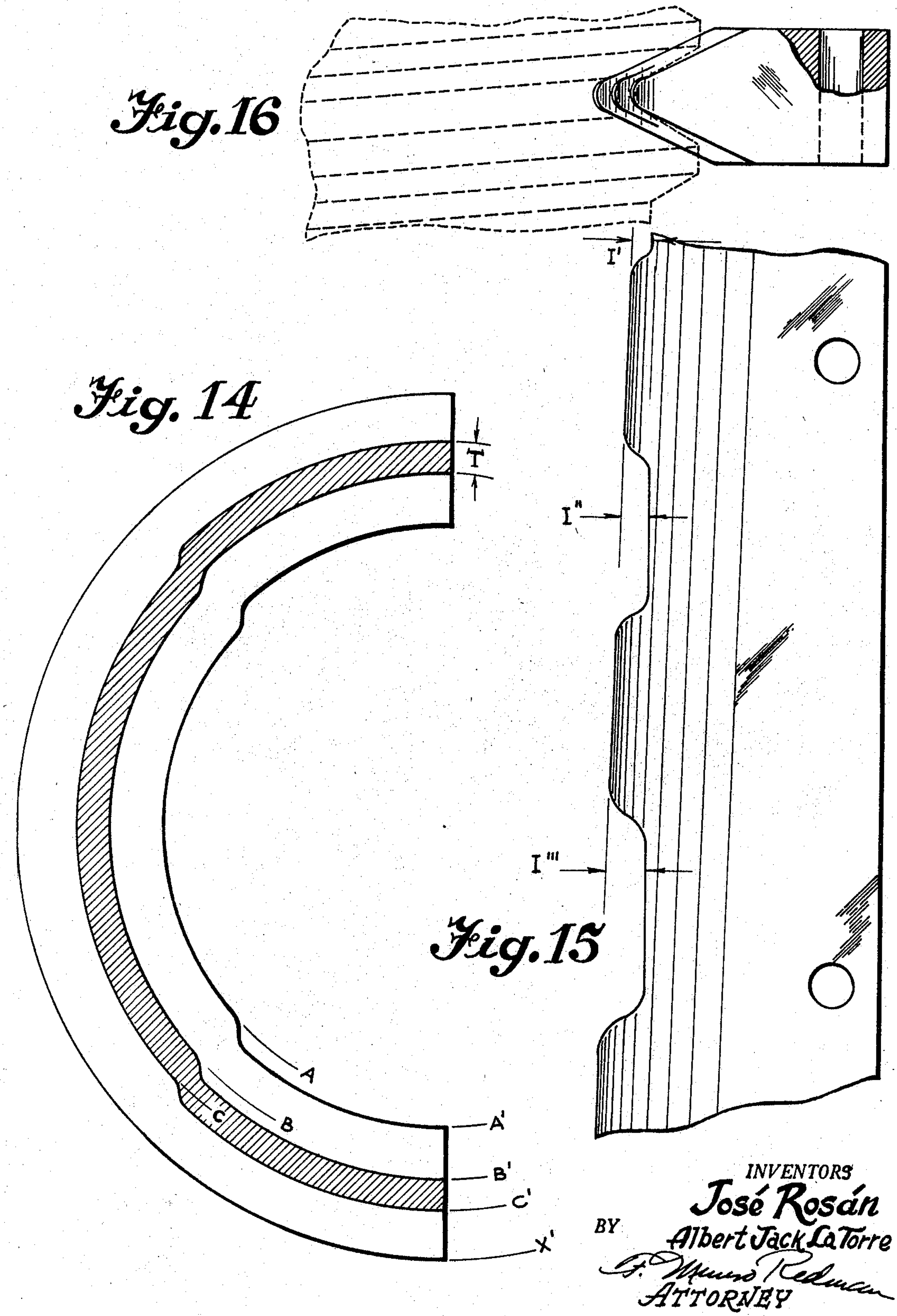
FIG. 14 is a view on an enlarged scale of a cross-section of the insert wall in the region to which an alternative embodiment of the lock is being applied, the view being taken in a plane similar to that of FIG. 3.
FIG. 15 is a fragmentary elevational view of another embodiment of the die blade for producing an interrupted lock.
FIG. 16 is a top view of the blade of FIG. 15 with an insert engaged therewith shown in dashed lines.

In order to illustrate the operative effect of this construction more clearly, a large scale fragmentary sectional view corresponding to the showing of FIG. 3 has been depicted in FIG. 14. Typical dimensions of an insert which has been so produced are:

| | |
|---|---|
| A—Deformed minor diameter | .2620 |
| A′—Minimum minor diameter | .2725 |
| B—Deformed internal major or root diameter | .3068 |
| B′—Normal internal major or root diameter | .3173 |
| C—Deformed external minor or root diameter | .3165 |
| C′—Normal external minor or root diameter | .3375 |
| X′—Mean major external diameter | .3725 |
| T—Wall thickness | .010 |

An insert having these typical dimensions is shown as nearly as possible to scale in the schematic view of FIG. 14.

Figure 4:
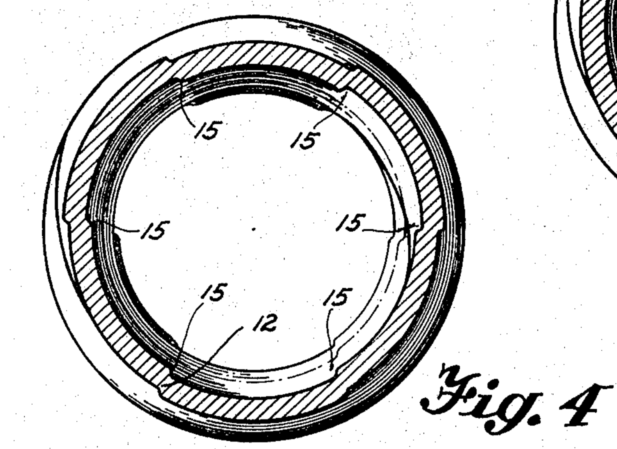
FIG. 4 is a bottom end view showing of an optional embodiment of the insert of FIG. 1.
Figure 6:
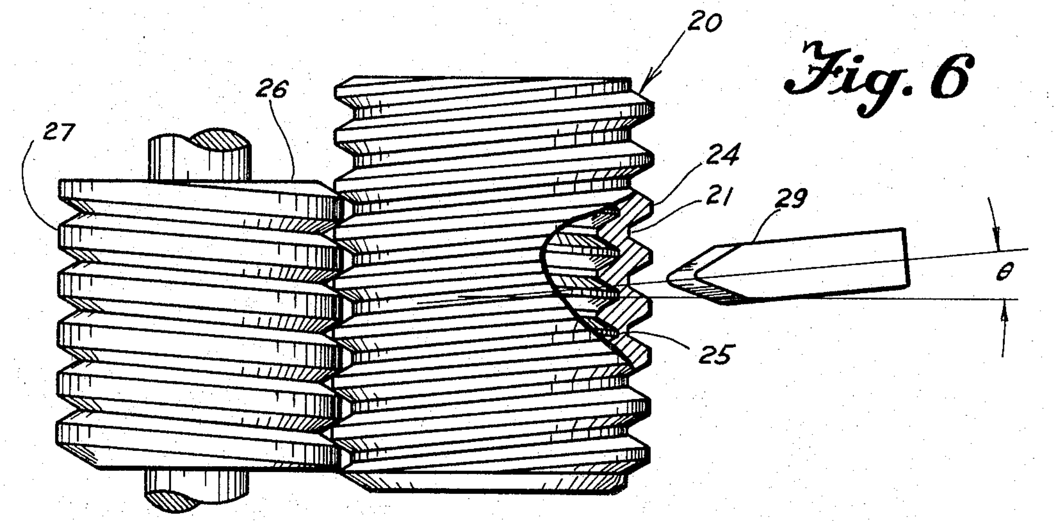
FIG. 6 is a view illustrating a step in the manufacturing operation in which the blade is pressed against the wall of a rotating insert, supported by a cooperating roller, to form the thread locking indentations.

A preferred manner in which the indentation pattern shown in FIGS. 3, 4 and 14 may be produced during manufacture is illustrated in FIG. 6 of the drawings, in which a partially manufactured insert blank 20 having external threads 24 and internal threads 25 is mounted for driving rotation against a backup roller 26 having the same thread form 27 as the extrenal threads 24 of the insert. An indenting die blade 29 is mounted in position to exert pressure against insert 20 in a direction which diverges from a normal to a rotational axis of the insert by the helix angle $\theta$ of the external thread. This means that as the insert is driven rotationally by frictional contact with the threads 27 of the backup and driving roller 26 the blade 29 will be able to apply an inwardly deforming force to the thread root 21 of the insert 20. This deforming force will be applied through one or more turns of the thread helix and will produce a corresponding internal deformation, as illustarted in FIGS. 1 and 3, by virtue of the interrupted character of the die blade 29.

The details of this interrupted blade construction may be seen more clearly from the fragmentary view of FIG. 7. In this figure a fragmentary portion of the blade is shown in perspective detached from the associated apparatus for supporting the blade in position and forcing it against the insert 20.

In this drawing the blade 29 has been shown schematically to illustrate on an enlarged scale the serrated nature of the portion of the blade which engages the insert. It will be seen that the blade 29 is notched or serrated to form a plurality of indented teeth. It will be recognized that each tooth 30 projects for a distance of approximately .010″ ahead of the adjacent notched or retracted portion 31. These dimensional differences are too small to be readily visible unless the scale is exaggerated for visual clarity: hence the projecting teeth 30 are shown extending from the notched portions 31 by distances many times greater than the actual distance.

An alternative method for supporting the insert during the rolling operation which produces the lock is shown in FIG. 8. Here the resistance to the pressure exerted by blade 29 against the insert 20 is supplied by means of a thread block 35 having longitudinal lands 36 and grooves 37. These lands and grooves are spaced the same as the corresponding thread pitch dimensions of the insert 20. The thread block 35 may be traversed in the direction indicated by the arrow 39; the grooves and lands will engage with the external threads 24 on the insert 20 with sufficient force to draw the latter along the die blade 29, in order to produce the locking indentations over the required number of revolutions.

It will be recognized that the thread block 35 must exert pressure against the insert in a direction normal to the direction of travel in order that adequate driving force may be applied to traverse the insert 20 along the die blade 29. It will also be recognized that the die blade 29 is fixed relative to the rotational axis of the insert at the helix angle $\theta$ so that the blade may properly engage with the thread root as the part is traversed therealong.

A still further alternative in the application of the interrupted lock may be effected by so applying the die blade as to produce progressively deeper indentations as the rolling is carried out. A blade for producing such a progressive indentation is shown fragmentarily in FIG. 15 to an enlarged scale. The progressive indentations are shown as varying from an initial value, which may be of the order of .001 inch, to an ultimate value which may be of the order of .012 inch. These progressively deeper indentations, for example I′, I″, I‴ . . . , may be applied over as many as four complete convolutions of the insert, although in normal practice it may be restricted to two and one-half turns or less.

The external deformation produced by the indenting blade may range from .000 to .021 total, or .0105 inch per side, to produce an internal deformation of .005 per side or a total of .010″ internal deformation. The deformations within this range are typical of those which have been successfully applied to thin-walled inserts.

It will be understood, however, that the deformation utilized in a particular case will depend upon the class of the mating threaded member, as well as the closeness of the fit and the hardness of the screw material.

Figure 9:
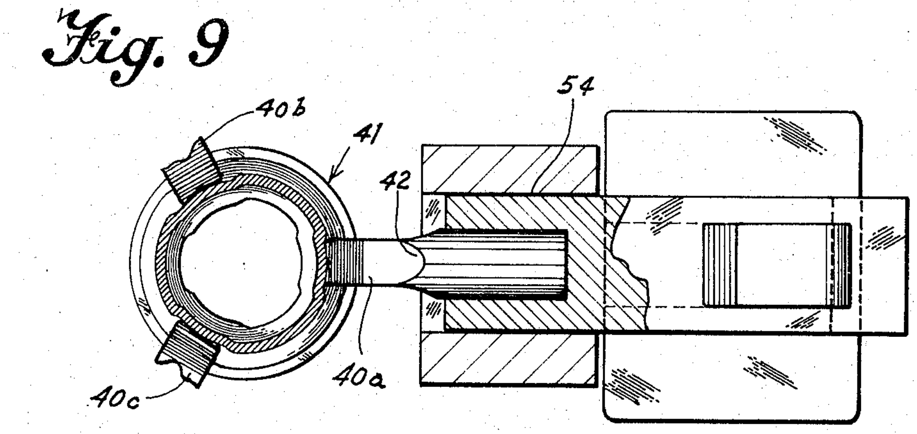
FIG. 9 is a schematic top view, partially in section, showing an alternative form of die blade application, taken as indicated by the line 9—9 in FIG. 10.
Figure 10:
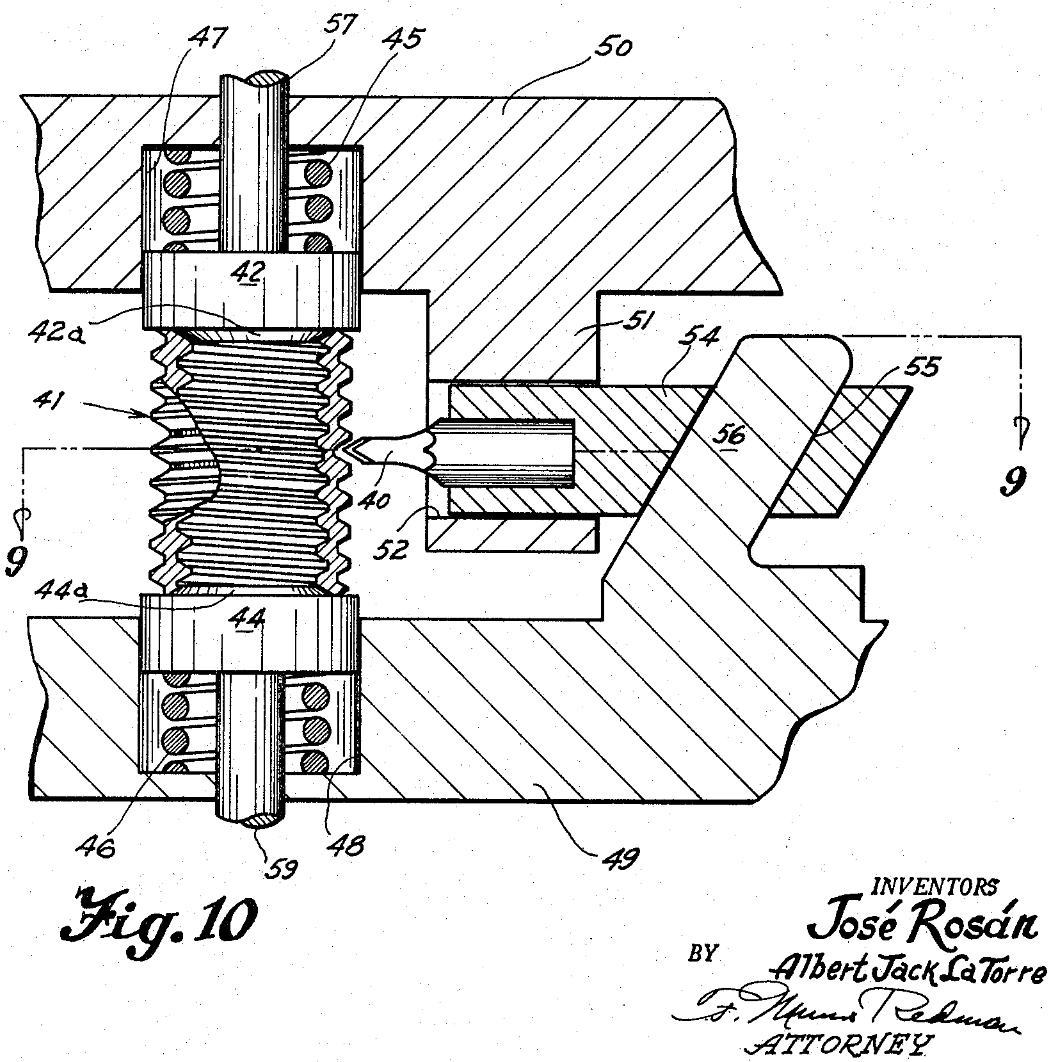
FIG. 10 is a schematic side view, partially in section, of the mechanism illustrated in FIG. 9, illustrating how an insert may be supported between a pair of opposed floating anvils during the indenting operation.

Another alternative method and mechanism for producing the lock is shown in FIGS. 9 and 10. In FIG. 9 there has been depicted schematically and partially in section, a fragmentary top view of one-third of the mechanism with the die blade directed toward the rotational axis of the insert 41. It will be understood that the fragmentary showings of FIGS. 9 and 10 represent only one-third of the mechanism. The complete mechanism includes three die blade control stations which are utilized by the operator to produce the complete lock. The embodiment, as illustrated, is particularly adapted to the production of the three-part lock as shown in FIG. 4, but it will be obvious that more stations could be provided with additional die blades so that an increased number of locking segments might be formed in the same operation. It will likewise be obvious that each of the stations must have its die blade set at an angle and in a position which will take account of the axial progression of the external threads of the insert. This will properly define the height above the table 49 at which the die blades **40*a*, 40*b* and 40*c*** are positioned when engaging the insert. It will also insure that the die blades will follow the helix angle properly. In other words, each successive die blade station passing in a clock-wise direction from the first encountered die blade will require a position advanced one-third of the pitch of the thread in a vertical direction.

More minute variations in longitudinal registry between the die blades and the anvils will be provided for by the resilient action of springs 45 and 46.

In this way the three die blades may be manipulated to simultaneously form three locking indentations. This arrangement has the additional advantage of providing its own backup pressure for the inserts, each pair of die blades acting to back up the operation being performed by the third. The insert 41 is mounted between upper anvil 42 and a lower anvil 44, which float within upper spring 45 and lower spring 46 respectively. Upper and lower springs 45 and 46 are housed in upper and lower recesses 47 and 48 respectively which also serve as guide-ways for the anvils 42 and 44. The guide-way 48 is formed in a supporting table or base 49 which has associated therewith guide-ways, not shown, but conventional in character, to maintain the lower table 49 and upper table 50 normally fixed relative to each other, while yet permitting movement of the upper table under the control of an operator. Extending downwardly from upper table 50 is an arm 51 having formed therethrough a guide-way 52 adapted to receive a die supporting arm 54 in which the die blade is rigidly mounted.

As may be seen to best advantage in FIG. 10 the die blade supporting arm 54 has formed therethrough, at an angle to the horizontal, a die traversing guide-way 55. The manner in which the die blade is forced against the insert 41 to accomplish the inward deformation of threads is as follows: the upper table 50 may be lowered by the operator by means of suitable mechanisms, not shown, but conventional in character. As the upper table 50 is so lowered the guide-way 55 will slide over a stationary cam 56 extending upwardly at an obtuse angle from the base 49. The guide-way 55 will thereupon be effective to force the die blade supporting arm 54 to move in a direction normal to the axis of rotation of the insert 41, sliding horizontally in its guide-way 52.

The use of the two opposing floating anvils 42 and 44 will permit the insert to "float" sufficiently to insure that the die blades will be operating on the thread root. The flanks of the threads will act to adjust the insert vertically until the die blades have reached the appropriate position in alignment with the root.

The floating anvils 42 and 44 will, of course, be supported during the operation by the upper anvil shaft 57 and the lower anvil shaft 59, and it will be apparent that the spring member 45 and 46 will permit the insert 41 to float with the anvils sufficiently to follow the thread helix through the desired number of convolutions. It is preferred that this will be from one to two complete revolutions. It will be observed that the upper anvil 42 has a frustoconcial projection **42*a* extending downwardly therefrom and that the lower anvil 44 has a small frusto-conical projection 44*a* projecting upwardly therefrom. These frusto-concial projections 42*a* and 44*a* will extend into the ends of the insert 41** and act as centering means to prevent the insert from being forced out of position when pressure is applied thereto by the die blade.

In certain usages it may be preferred to accomplish the locking action by a uniform constriction of the internal thread throughout a substantial length of the insert.

In certain other usages, the internal lock may be produced at one end of the insert. In the latter usage it is contemplated that the lock will extend over the several thread convolutions adjacent one end of the insert only. Normally this will be the end opposite that into which an associated bolt is threaded.

FIG. 9 is a top cross-sectional illustration of the automatic apparatus for providing locking indentations as herein described in an insert corresponding to the type depicted in FIG. 4.

FIG. 10 is an elevational cross-sectional view of the apparatus of FIG. 9.

Figure 11:
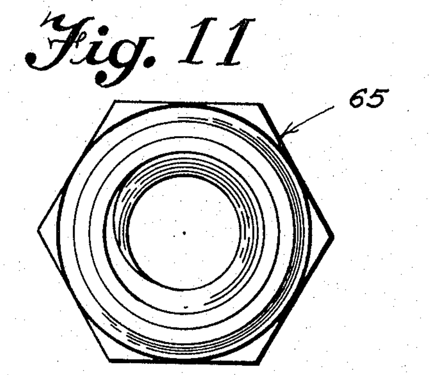
FIG. 11 is a top view of a thick walled nut into which the thread lock of the present invention has been incorporated, taken looking in the direction indicated by line 11—11 of FIG. 12.
Figure 12:
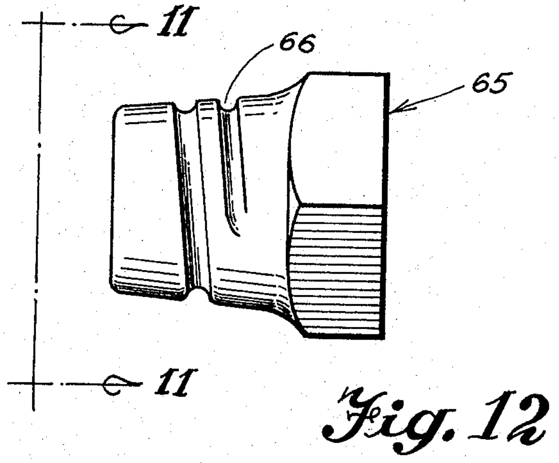
FIG. 12 is an elevational view of the nut of FIG. 11 showing external indentations applied in preparation for introducing the internal lock.
Figure 13:
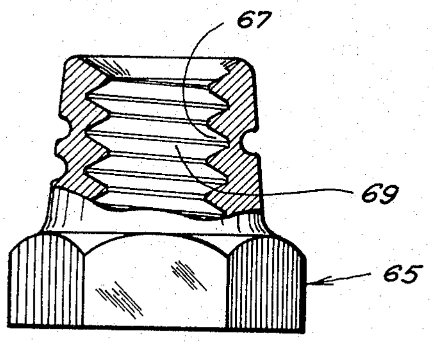
FIG. 13 is a side sectional view of the insert of FIGS. 11 and 12, illustrating the internal configuration after the addition of the externally applied interrupted 360° peripheral lock.

In FIG. 11 the invention is shown as applied to a standard form of hexagonal nut 65. This nut 65 is shown in side view in FIG. 12 as having an external indentation 66 applied therethrough over somewhat more than a single thread convolution. The result of applying this external deformation is shown in cross-section in FIG. 13. As shown in these three figures, considered together, an intermittent lock is obtained by utilizing an interrupted die blade 29 as shown in the preceding FIGS. 6 to 8, and rolling over the indented groove 66 a second time to produce additional intermittent inward deformation sufficient to achieve the locking result required. It will be appreciated that the inward deformation may be of such order to magnitude that it is not readily visible in the showing FIG. 13, which has not been exaggerated in scale as have the views of FIGS. 3 and 4, for example. However, a sufficient inward deformation is produced to insure that the internal thread wall will be deformed intermittently sufficiently to produce the desired locking effect. This deformation is indicated at 67 where the inner thread root 69 has been deformed inwardly to achieve the desired result.

A still further alternative embodiment of the lock applied to a thin-walled insert of the character shown in FIGS. 1 to 10 may be obtained through the use of a die blade in which the serrations do not project a uniform distance from the backing portion. Certain types of material do not respond as readily as other types to the deformation produced by the blade having indentations of uniform depth along the die blade, as shown in FIG. 7. In such situations we have found it desirable to apply the lock by progressively increasing the degree of indentation. The die blade for producing this result will provide indentations increasing by uniform steps of .001 inch, for example, over a range from 0 to .012 inch. We have found that when such a slight increase in the depth is applied a gradual application of the locking force is obtained which results in a gentle lock application free from galling and will yet maintain a locking effect even though subjected to severe vibration.

Figure 17:
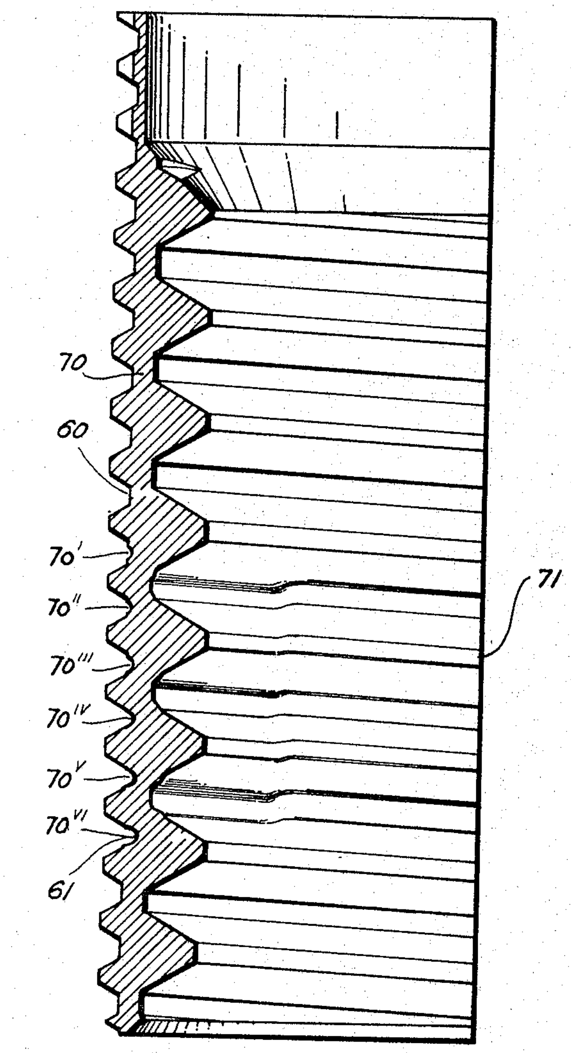
FIG. 17 is a quarter-sectional view to an enlarged scale of the insert wall incorporating an alternative embodiment of the lock of the invention.

Another embodiment of this invention is illustrated in FIG. 17, shown in quarter-sectional view, in which the wall 70 is shown as gradually indented in the locking region, generally indicated at 71, in order to produce a lock whose application is so gentle that any possibility of galling or seizing is eliminated. It has been found that if the root indentation is accomplished over a plurality of turns of the root 60 of the thread helix, a firm, gentle and positive lock is obtained which will be effective on class 2 mating screws as well as class 3 screws. FIG. 17 shows the application as being so gradual, so that the thread root is indented .001 inch for each thread convolution starting with 0 and increasing to a maximum of .006, by steps of .001 each, as seen at 70′, 70″ . . . $\mathbf{70^{vi}}$.

Figure 18:
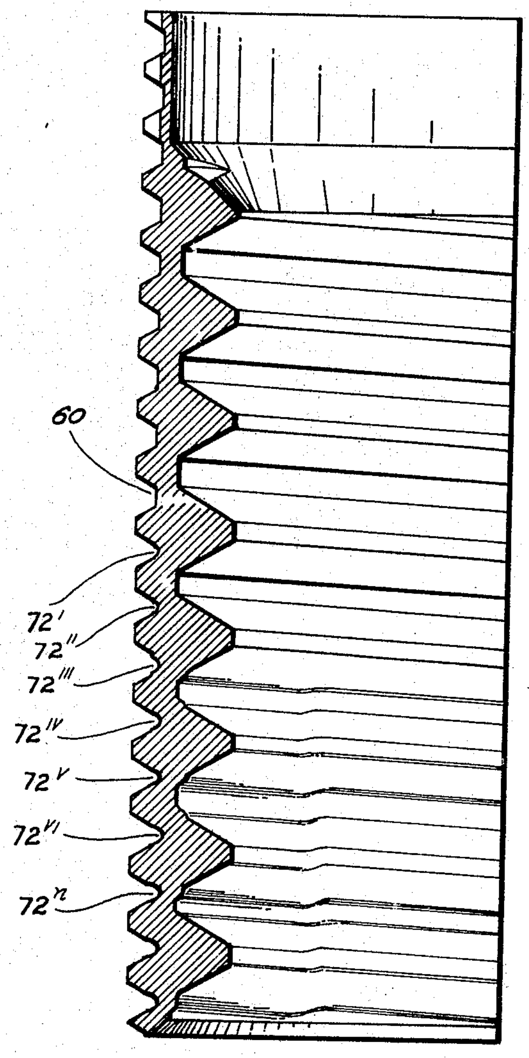
FIG. 18 is a view similar to that of FIG. 17 but showing still another alternative embodiment of the invention.

Another embodiment of the invention is shown in FIG. 18 in which a series of initial indentations 72′, 72″, 72‴ . . . similar to that shown in the embodiment of FIG. 17, starting with 0 deflections, increase by regular steps of .001 inch up to a maximum of .006 inch. The remainder of the insert is uniformly deformed at the roots to a depth of .006 inch, so that the initially tapered section 72′, 72″ is succeeded by a uniformly indented root section $\mathbf{72^n}$.

Figures 19, 20, 21:
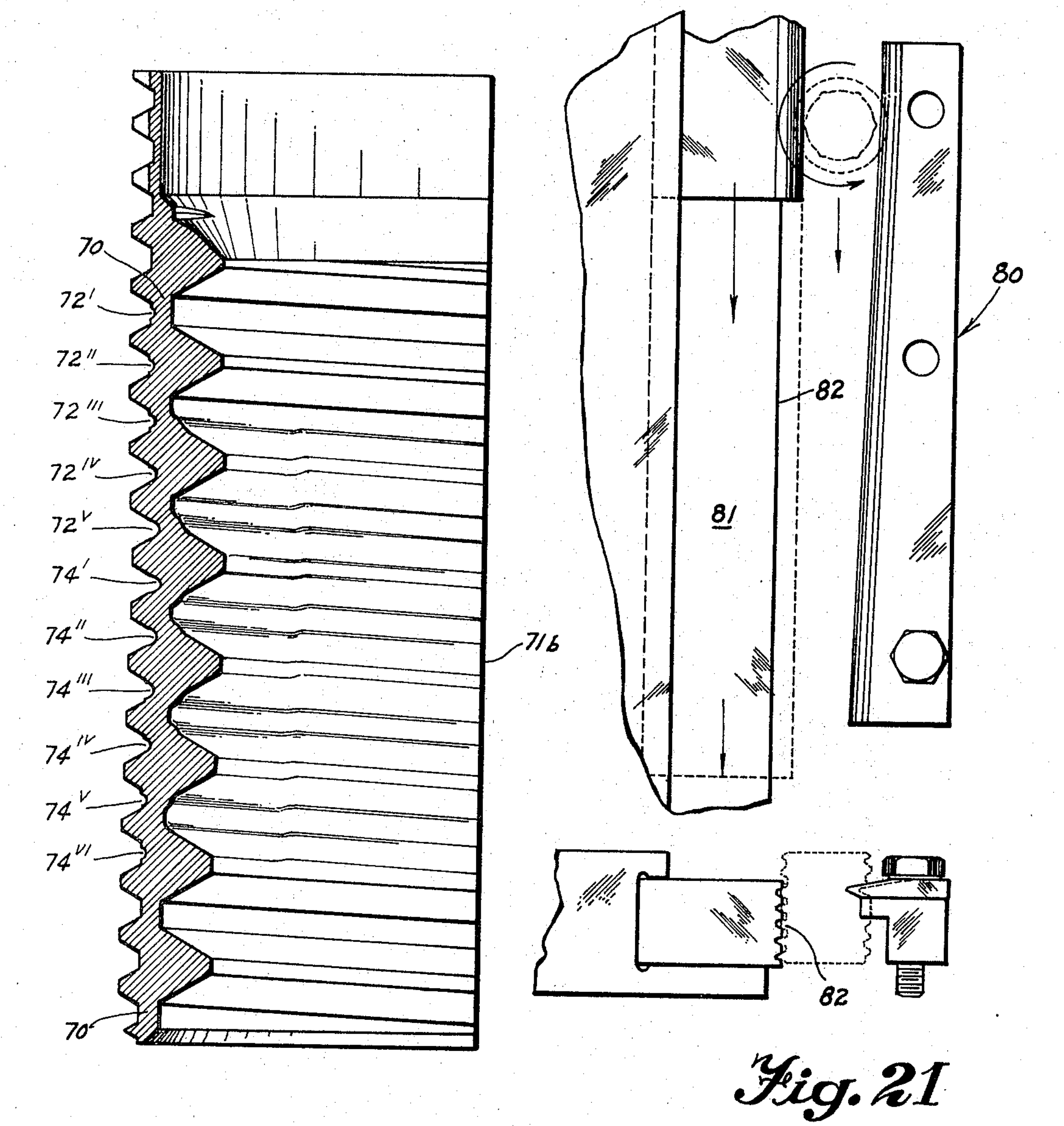
FIG. 19 is a view similar to that of FIG. 17 showing yet another embodiment of the invention.
FIG. 20 is a top plan view of a preferred mechanism for applying the lock embodiments illustrated in FIGS. 17–19.
FIG. 21 is an end view of the mechanism illustrated in FIG. 20.

Another alternative embodiment is illustrated in FIG. 19 in which a "bellows" action is obtained wherein a section having a uniformly increasing inward taper, 72′, 72″ . . . , is followed by another section having uniformly increasing outward taper as shown at 74′, 74″ . . . to restore it to the original unindented condition.

These several embodiments of the improved thread lock of the invention are most readily applied by the use of means, such as the tapered blade 80 shown in FIG. 20 fixed in position opposite a back-up member 81. This member 81 may have the form of a conventional thread block which presents a conventionally designed thread roll face 82 to the inserts, acting to draw them along and cause rotation thereof during the progression, so that the blade applies its indenting force over a number of convolutions.

It will be seen from the above description that there has been disclosed means for making the most effective use of the resilient characteristics of thin-walled inserts. This has been accomplished by means not previously known in the art to produce locking structures adapted to hold male fasteners produced to a lower dimenstional tolerance in fixed position relative to female fasteners produced to a relatively high standard.

What is claimed is:

1. The method of making a threaded insert with an internal lock, comprising the steps of:

forming external and internal threads on a tubular body;

providing inwardly and laterally to the axis of the insert body, an external force to a small segment of the root only of the external thread convolutions so as to inwardly deform a portion of said internal threads opposite the deformed portion of the external thread root.

2. The method of making a threaded insert as described in claim 1 wherein a plurality of external forces are applied at circumferentially spaced points about the body, said forces being applied in a plane normal to a plane passing longitudinally through the body axis, thereby forming a plurality of internal locking projections in the same plane but at intermittent positions along different portions of the internal thread helix.

3. The method of making a threaded insert as described in claim 2 wherein said external forces are applied simultaneously.

4. The method of making a threaded insert as described in claim 2 wherein the application of said external forces are progressingly greater so that the internal locking projections progressively increase in size.

5. The method of making a threaded insert as described in claim 2 wherein the external lateral force is applied in a plane inclined with respect to the axis of the body, the angle of inclination corresponding to the lead angle of the root thread helix.

6. The method of making a threaded insert as described in claim 2 wherein during the application of the external force the insert body remains stationary.

7. The method of making a threaded insert as described in claim 2 wherein during the application of the external force the insert body is rotated about its axis and the source of the external force is moved tangentially to the external thread root of the insert body in a plane normal to the body axis.

References Cited

UNITED STATES PATENTS

| | | | |
|---|---|---|---|
| 328,951 | 10/1885 | Lewis. | |
| 2,165,009 | 7/1939 | Rosenberg. | |
| 3,163,872 | 1/1965 | Rosen et al. | 10—86 |

ANDREW R. JUHASZ, *Primary Examiner.*